United States Patent [19]

Wagensommer et al.

[11] 4,269,955

[45] May 26, 1981

[54] CATALYST COMPOSITION POLYMERIZATION OF ISOOLEFINS AND MULTIOLEFINS

[75] Inventors: Joseph Wagensommer, Westfield; Pacifico V. Manalastas, Jersey City, both of N.J.

[73] Assignee: Exxon Research & Engineering Company, Florham Park, N.J.

[21] Appl. No.: 8,789

[22] Filed: Feb. 1, 1979

Related U.S. Application Data

[63] Continuation of Ser. No. 827,700, Aug. 25, 1977, abandoned.

[51] Int. Cl.³ .............................................. C08F 4/52
[52] U.S. Cl. ........................... 526/185; 252/429 R; 252/431 R
[58] Field of Search .................. 526/185; 252/429 R, 252/431 R

[56] References Cited

U.S. PATENT DOCUMENTS

| | | | |
|---|---|---|---|
| 3,349,065 | 10/1967 | Kennedy | 260/85.3 |
| 3,560,458 | 2/1971 | Kennedy et al. | 260/85.3 |
| 3,835,097 | 9/1974 | Scandiglin et al. | 260/28.5 A |
| 3,850,895 | 11/1974 | Priola et al. | 526/185 |
| 3,965,078 | 6/1976 | Priola et al. | 526/185 |
| 4,029,866 | 6/1977 | Kennedy | 526/185 |
| 4,038,474 | 7/1977 | Kuda et al. | 526/185 |
| 4,039,733 | 8/1977 | Kuda et al. | 526/185 |
| 4,081,590 | 3/1978 | Kennedy | 526/185 |
| 4,151,113 | 4/1979 | Thaler | 526/185 |
| 4,154,916 | 5/1979 | Wagensommer et al. | 526/185 |
| 4,171,414 | 10/1979 | Wagensommer et al. | 526/185 |

FOREIGN PATENT DOCUMENTS 1362295 8/1974 United Kingdom.

*Primary Examiner*—William F. Hamrock

*Attorney, Agent, or Firm*—Richard E. Nanfeldt

[57] ABSTRACT

The present invention relates to improved catalyst compositions used in the formation of substantially gel-free copolymers and terpolymers of isobutylene and one or more dienes having an $\overline{M}n$ of about less than 500,000, a mole % unsaturation of about 8 to about 45, and a polydispersity value of about 3 to about 30, wherein the mixture of isobutylene and diene monomers and a cosolvent are contacted with the catalyst composition at polymerization conditions ($-50°$ to $-100°$ C.) wherein the improvement includes the hydrocarbon soluble catalyst composition being formed from the reaction product of a material of the formula:

$$R_mAlX_{3-m}$$

wherein m is an integer of from 1 to 3 inclusive, R is the same or different alkyl radical of straight or branched chain structure of from 1 to 7 carbons and X is the same or different halogen selected from the group consisting of chlorine and bromine, and a halogen containing material which is Y moles of halogen, halogen acid, or mixed halogen per mole of aluminum compound wherein the halogen is selected from the group consisting of chlorine and bromine wherein the molar ratio of the formed catalyst composition to the monomer is critical by selecting at about 0.0001 to about 0.001 in order to obtain the desired elastomeric co- and terpolymers. The molar ratio of the halogen containing material to the $R_mAl_{3-m}$ used in forming the catalyst is critically selected at about 0.014 to about 0.065. This improved catalyst composition permits the formation of high quality elastomeric products at improved polydispersity levels and higher monomer conversions wherein the catalyst composition is soluble in the inert solvent.

3 Claims, No Drawings

CATALYST COMPOSITION POLYMERIZATION OF ISOOLEFINS AND MULTIOLEFINS

This is a continuation of application Ser. No. 827,700, filed Aug. 25, 1977 now abandoned.

BACKGROUND OF THE INVENTION

1. Field of the Invention

The present invention relates to an improved catalyst composition for the formation of gel-free copolymers and terpolymers of isobutylene and one or more dienes having an $\overline{M}n$ of about less than 500,000, a mole % unsaturation of about 8 to about 45, and a polydispersity value of about 3 to about 30, wherein the mixture of isobutylene and diene monomers and a cosolvent are contacted with the catalyst composition at polymerization conditions ($-50°$ to $-100°$ C.) wherein the improvement includes the hydrocarbon soluble catalyst composition being formed from the reaction product of a material of the formula:

$$R_mAlX_{3-m}$$

wherein m is an integer of from 1 to 3 inclusive, R is the same or different alkyl radical of straight or branched chain structure of from 1 to 7 carbons and X is the same or different halogen selected from the group consisting of chlorine and bromine, and a halogen containing material which is Y moles of halogen, halogen acid, or mixed halogen per mole of aluminum compound wherein the halogen is selected from the group consisting of chlorine and bromine wherein the molar ratio of the formed catalyst composition to the monomer is critical by selecting at about 0.0001 to about 0.001 in order to obtain the desired elastomeric co- and terpolymers. The molar ratio of the halogen containing material to the $R_mAlX_{3-m}$ used in forming the catalyst is critically selected at about 0.014 to about 0.065. This improved catalyst composition is soluble in the inert solvent and permits the formation of high quality elastomeric products at improved polydispersity levels and higher % conversions.

2. Description of the Prior Art

Aluminum compounds are widely used as polymerization catalysts. Aluminum chloride is commonly used to initiate cationic polymerizations but it has the disadvantage of little or no solubility in many desirable hydrocarbon systems especially where homogeneous polymerizations are required. Aluminum boride which is soluble in hydrocarbons, has limited utility as such in a number of desirable systems. Alkylaluminum dihalides are generally less reactive than the aluminum halides but offer the advantage of excellent hydrocarbon solubility. To enhance their reactivity, they are frequently used together with cocatalysts. Proton donators like the halogen acids, are placed in the polymerization medium and are said to be ionized by the aluminum compound thereby releasing protons to initiate polymerization. Halogens and organic halogen compounds are also ionized in situ to initiate cationic polymerization. In the case of dialkylaluminum halides and aluminum alkyls, such cocatalysts are required since these compounds are not generally active in themselves. Also compounds like dialkylaluminum iodides and alkylaluminum diiodides, which are generally not effective initiators in and of themselves, have been utilized with halogen cocatalysts, such as iodine, to initiate the polymerization. The iodine must be present in the polymerization medium and is ionized by the aluminum component, the ions initiating the polymerization. This is a good illustration of cocatalysis since neither the starting alkylaluminum iodides nor the product aluminum iodide is a catalyst by itself so the cocatalysts must be present in the polymerization medium.

The catalyst systems of the instant invention differ markedly from those of the prior art. The halogens, halogen acids, interhalogen compounds and organic halogen compounds are not used as cocatalysts but instead are pre-reacted with the organic aluminum compound to generate novel catalyst species which are hydrocarbon soluble and can be utilized in cationic polymerization systems. These catalysts are generally more reactive and give higher molecular weights than the corresponding organoaluminum compounds from which they are derived. Furthermore, the prereacted catalysts of the instant invention give products superior to the polymerization products obtained using halogens, halogen acids, interhalogen compounds or organic halides as cocatalysts.

Numerous prior art examples using cocatalysts are extant. These are clearly distinguishable from the catalysts of the instant invention. The halides, etc. of the prior art are used either in situ as cocatalysts or as complexing agents.

U.S. Pat. No. 2,220,930 teaches the manufacture of polymers using catalysts such as dialkylaluminum halides or alkylaluminum halides, generally represented as $MX_mR_n$ where M represents aluminum, gallium or boron, X represents halogen, R represents a monovalent hydrocarbon radical, m or n represent integers 1 to 2 inclusive, and $m+n=3$. The catalyst can also be a complex of the above compounds with inorganic halides (e.g. NaCl) or with ammonia or amines. In practice, U.S. Pat. No. 2,220,930 utilized either dialkylaluminum halides or alkylaluminum dihalides alone or in a mixture of equal parts which is commonly known as the sesquihalide. The polymers of isobutylene obtained were low molecular weight resins.

U.S. Pat. No. 2,387,517 relates to the manufacture of polymers prepared by the copolymerization of various unsaturated compounds in the presence of catalysts of the type $MX_mR_n$ where M represents aluminum, gallium, or boron, X represents a halogen, R represents a monovalent hydrocarbon radical, m or n represents integers from 1 to 2 inclusive and $m+n=3$. The invention is particularly directed to the formation of curable rubber-like products by the copolymerization of isobutylene with low molecular weight diolefins, especially those having 4 to 6 carbon atoms. The products are described as ranging in molecular weight from 1000 to 3000 up to 300,000 or higher. However, the type of molecular weight is not indicated (most likely viscosity average molecular weight) nor is an actual polymer approaching 300,000 molecular weight prepared. The composition used as catalysts in the above two related cases are not prepared by prereacting an alkyl aluminum halide with halogens, halogen acid or interhalogen compounds of the instant invention and do not suggest the superiority which the instant compositions demonstrate as catalysts.

U.S. Pat. No. 2,388,428 relates to an improved method for affecting organic chemical reactions by generating Friedel-Crafts metal halide catalysts in situ. It teaches dissolving an organoaluminum compound in a hydrocarbon reactant being charged to the process and contacting said solution with an excess of hydrogen halide in a reaction zone under hydrocarbon conversion conditions whereby an aluminum halide catalyst is generated in situ and the conversion reaction is affected. The hydrogen halide is added in excess (in an excess over the amount required to completely convert the organoaluminum compound to the aluminum halide so as to generate aluminum halide (e.g., AlCl$_3$) in situ). Such generation of aluminum chloride is described as being subject to greater control and of greater precision than prior art methods of dissolving or suspending the aluminum halide in the reaction mixture. Particular note should be taken of the fact that the catalyst components are not prereacted and then added to the reaction zone, but are reacted in situ. Furthermore, the stoichiometry is quite different from the catalysts of the instant invention. The molar ratio of catalyst to monomer is greater than 0.026 and the cocatalyst to catalyst ratio is greater than 4.4. The use of the catalyst of U.S. Pat. No. 2,388,428 for the purposes of polymerization is not taught as the examples are directed solely to isomerization and alkylation at temperatures of 10° C. to 77° C.

U.S. Pat. No. 3,349,065 teaches an improved catalyst system for producing high molecular weight Butyl rubbers, having less than 5.5% mole unsaturation by a slurry process which are highly gelled (4.7 to 70%). The catalyst system comprises a dialkylaluminum halide together with a small but critical amount of an anhydrous hydrogen halide as a promoter (cocatalyst). The amount of anhydrous hydrogen halides used ranges from 0.01 mole to 0.05 mole promoter per mole of dialkylaluminum monohalide. The maximum desirable ratio is 0.05 mole promoter per mole of catalyst. Furthermore, the hydrogen halide is added to a solution containing both the dialkylaluminum chloride and monomer and is not prereacted with said organoaluminum compound as in the method of the instant invention. This patent does not teach, imply or infer the use of a solution process for the formation of gel free elastomers.

U.S. Pat. No. 3,562,804 also describes the use of an organoaluminum compound in conjunction with hydrogen chloride or a C$_3$–C$_7$ organic halide compound as promoter to produce low viscosity mastic compositions by a slurry process. Here again, the catalyst and promoter were combined in the presence of monomer and all examples teach the separate addition of catalyst and promoter to the polymerization (monomer) mixture. The catalyst to monomer ratio is at least about 0.001 and the rate of cocatalyst to catalyst is greater than about 3.0.

U.S. Pat. No. 3,850,897 teaches a procedure of the production of polymers and copolymers of isobutylene. The catalyst disclosed is of the general formula RAl(YR')X where Y is an oxygen or sulfur atom together with a wide variety of promoters. The aluminum compounds disclosed in this patent are different from those of the instant invention. Furthermore, the patent in question teaches the necessity of combining catalyst and cocatalyst in the presence of monomers. Stepwise addition of catalyst and cocatalyst to the polymerization medium is demonstrated in the examples. The catalyst to monomer ratio is at least about 0.0038.

U.S. Pat. No. 3,835,079 teaches hot melt compositions comprising styrene, isobutylene copolymer wax and a primary resin. The catalysts employed a system utilizing a primary resin. The catalysts employed a system utilizing a primary component alkylaluminum dihalide with a promoter (cocatalyst) such as hydrogen halide. The maximum cocatalyst is 30 mole percent of the primary catalyst. A more limited range, 2.5 to 15% is preferred or 5 to 10% with cocatalysts such as water. The range of compositions is clearly outside that of the instant invention. Furthermore, the promoters are stated to be cocatalysts in this patent while they are consumed in a prior reaction in the instant invention and are not available to serve as cocatalysts.

U.S. Pat. No. 3,560,458 teaches a polymerization process utilizing a catalyst of the type Al(M)$_2$R where M is an alkyl group and R is alkyl, hydrogen or halogen. It is obvious that the catalyst intended for use is the dialkyl or the monohalide. Experimental procedure reveals a stepwise addition of cocatalyst promoters to a solution containing catalyst in the cationically polymerizable monomer. The molar ratio of catalyst to monomer is at least about 0.007.

British Pat. No. 1,362,295 teaches a catalyst suitable for use in the polymerization of unsaturated compounds and a process for employing such a catalyst. The catalyst used is a two-component substance, the primary component being R$_2$AlX wherein R is a hydrocarbon or hydrogen radical, X can be hydrocarbon, hydrogen or halogen. The secondary component is represented as YZ wherein each of Y and Z are the same or different halogen. The component can be present in a ratio of primary to secondary of from 0.1:1 to 1000:1.

All examples contain active cocatalysts, and no criticality for prereaction of components is taught. Furthermore, the ratios of materials involved are such as to not practice the invention of the instant specification and no showing is made of there being a ratio demonstrating superior performance.

Other patents which are non-applicable to the instant invention are: U.S. Pat. Nos. 3,757,000 and 3,560,458; British Pat. Nos. 1,309,131 and 1,157,043; and U.S. Patent Applications Ser. Nos. 635,695 and 737,917.

SUMMARY OF THE INVENTION

The present invention relates to improved catalyst compositions for the formation of substantially gel free copolymers and terpolymers of isobutylene and one or more dienes having an $\overline{M}n$ of about less than 500,000, a mole % unsaturation of about 8 to about 45, and a polydispersity value of about 3 to about 30, wherein the mixture of isobutylene and diene monomers and a cosolvent are contacted with the catalyst composition at polymerization conditions (−50° to −100° C.), wherein the improvement includes a hydrocarbon soluble catalyst composition being formed from the reaction product of a material of the formula:

wherein m is an integer of from 1 to 3 inclusive, R is the same or different alkyl radical of straight or branched chain structure of from 1 to 7 carbons and X is the same or different halogen selected from the group consisting of chlorine and bromine, and a halogen containing material which is Y moles of halogen, halogen acid, or mixed halogen per mole of aluminum compound wherein the halogen is selected from the group consisting of chlorine and bromine wherein the molar ratio of the formed catalyst composition to the monomer is critical by selecting at about 0.0001 to about 0.001 in order to obtain the desired elastomeric co- and terpolymers. The molar ratio of the halogen containing material to the $R_mAlX_{3-m}$ used in forming the catalyst is critically selected at about 0.014 to about 0.065 and the catalyst composition is soluble in the inert solvent.

Accordingly, it is an object of the instant invention to provide improved catalyst compositions for the formation of high quality, substantially gel free elastomers of co- and terpolymers of isobutylene and one or more dienes having an $\overline{M}n$ of less tyan about 500,000, a mole % unsaturation of about 8 to about 45, and a polydispersity of about 3 to about 30. The catalyst is formed from the reaction of $R_mAlX_{3-m}$ and a halogen containing material at a molar ratio of the halogen containing material to the $R_mAlX_{3-m}$ of about 0.014 to about 0.065. The formed catalyst is subsequently used at a molar ratio of catalyst to monomer of about 0.0001 to about 0.001, wherein improved monomer conversion at higher polymerization temperatures are readily attainable thereby improving the efficiency of the process.

The improved catalyst compositions provide a process whereby it is possible to reduce the ratio of isobutylene to cosolvent thereby resulting in higher monomer % conversion, improved economics as well as increased cement concentration.

GENERAL DESCRIPTION

The novel improved halogenated organoaluminum catalyst compositions employed in the process of the instant invention are prepared by reacting a material of the formula $R_mAlX_{3-m}$ wherein m is from 1 to 3, R is an alkyl radical of straight or brainched chain structure of from 1 to 7 carbons and X is the same or different halogen selected from the group consisting of chlorine and bromine and a halogen containing material which Y moles of a halogen, halogen acid, or mixed halogen per mole of aluminum compound wherein the halogen is selected from the group consisting of chlorine and bromine.

In a more particular embodiment, novel organoaluminum catalyst compositions are prepared by reacting a material of the formula $RAlX_2$ wherein R is an alkyl radical of straight or branched chain structure of from 1 to 7 carbons and X is the same or different halogen selected from the group consisting of chlorine and bromine with the halogen containing material which is Y moles of a halogen, halogen acid, or mixed halogen wherein the halogen is selected from the group consisting of chlorine and bromine.

In an alternative embodiment, the novel catalyst compositions are prepared by mixing materials of the formula $R_2AlX$ wherein R is the same or different alkyl radical of straight or branched chain structure of from 1-7 carbons and X is a halogen selected from the group consisting of chlorine and bromine with the halogen containing material which is Y moles of a halogen, halogen acid, or mixed halogen per mole of dialkyl aluminum monohalide wherein the halogen is selected from the group consisting of chlorine and bromine.

In yet another embodiment, the novel catalyst compositions are prepared by mixing, before use, materials of the formula $R_3Al$, wherein R is the same or different alkyl radical of straight or branched chain structure of from 1-7 carbons with the halogen containing material which is Y moles of halogen, halogen acid, or mixed halogen per mole of trialkyl aluminum compound, wherein the halogen is selected from the organo consisting of chlorine and bromine.

The catalyst preparation is preferably carried out in a solvent, more preferably in a hydrocarbon solvent, most preferably in a paraffinic hydrocarbon liquid or mixtures thereof, of from 1 to 10 carbons which may be normal, branched or cyclic in structure. The components are preferably diluted in an inert paraffinic solvent such as butane, isobutane, pentane, isopentane, hexane, isomeric hexanes, cyclohexane, methylcyclohexane or mixtures of paraffinic solvents are the solvent of choice for the polymerization so as to facilitate mixing and reaction. The catalyst solution concentrations may range from 0.01 to 50%, preferably 0.2 to 20%, e.g. 1%.

The molar ratio of the $R_mAlX_{3-m}$ to the monomer is about 0.0001 to about 0.001, more preferably about 0.0002 to about 0.0008, and most preferably about 0.0004 to about 0.0006. The molar ratio of halogen containing material to $R_mAl_{3-m}$ is critically selected at about 0.014 to about 0.065, more preferably at about 0.025 to about 0.055 and most preferably about 0.030 to about 0.050. The formation of the catalyst is done prior to contact with the monomers and is preferably at least about 60 seconds, more preferably about 20, and most preferably about 5 thereby ensuring formation of the catalyst prior to contact with the monomers and thus minimizing adverse side reactions of either the halogen containing material.

The reactive catalyst composition thus prepared, exhibits higher catalytic activity and efficiency than catalysts of the prior art and permits polymerization reactions to be run which yield higher molecular weight polymers and copolymers at higher temperature and/or the inclusion of a greater degree of unsaturation in a polymer of either high or low molecular weight at temperatures higher than previously possible.

The catalyst compositions of this invention are particularly beneficial for homogeneous cationic solution polymerization in hydrocarbon media since they are more reactive than alkylaluminum dichlorides or dibromides alone. They also avoid difficulties associated with using hydrocarbon insoluble catalysts such as $AlCl_3$ since hydrocarbon slurries of the latter frequently cause gelation or fouling, while using polar solvent (i.e. methyl chloride) solutions of the latter catalyst require counteracting the effects of the polar catalyst solvent which is a nonsolvent for the polymer and require diluting the monomer with additional quantities of polymer solvent to maintain homogeneous polymerization conditions.

The improved catalyst compositions of this invention offer further benefits in that they frequently give higher molecular weight polymers and copolymers than the generally available organoaluminum compounds from which they are conveniently and inexpensively prepared. The formation of polymers of higher molecular weights with the novel catalysts of this invention frequently permits operation at warmer polymerization temperatures ($-50°$ to $-100°$ C.) while yielding equivalently high mole wt. polymers. Since polymer molecular weights generally decrease with increasing temperature in prior art cationic polymerizations, the ability of the catalyst compositions of the instant invention to permit manufacturing of high molecular weight polymers at higher temperature is a marked advance over the prior art. Since polymerizations are generally quite exothermic and frequently carried out at low temperatures, process limitations relating to solution viscosity, heat transfer rates, maximum solids contents and ultimately production capacity for a given size unit are encountered. Thus, it is beneficial and industrially quite valuable if the desired molecular weights can be attained at warmer polymerization temperatures. The present invention features these characteristics and advantages.

The catalysts of this invention are particularly valuable since they not only give high catalyst efficiencies and high monomer conversion but they also produce higher molecular weight polymers and copolymers at warmer temperatures than conventional catalysts.

One group of cationically polymerizable monomers suitable for use with the novel improved catalyst compositions of the instant invention are cationically polymerizable unsaturated compounds, especially unsaturated hydrocarbons. Particularly valuable polymers can be prepared from isoolefins of from 4 to 20 carbons, multiolefins of from 5 to 20 carbons, or mixtures thereof to produce homopolymers and copolymers. Examples of such unsaturated hydrocarbons include but are not restricted to isobutylene, 2-methylbutene, 3-methylbutene-1, 4-methylpentene-1, and $\beta$-pinene. Multiolefins include but are not limited to butadiene, isoprene, piperylene, 2,3-dimethylbutadiene, cyclopentadiene, methyl cyclopentadiene, 1,3-cyclohexadiene, dimethylfulvene and divinylbenzene.

The catalyst composition of this invention is prepared by diluting in an inert solvent, preferably a hydrocarbon solvent, more preferably a paraffinic hydrocarbon solvent, most preferably a paraffinic solvent with carbon atoms of 1 to 10, and the catalyst composition which is a reaction product of a hydrocarbyl aluminum halide compound together with a halogen, interhalogen, or mixed halogen.

The hydrocarbyl aluminum compound has the general formula $R_mAlX_{3-m}$ wherein R is a hydrocarbyl group, preferably an alkyl group up to $C_7$, most preferably a $C_1$ to $C_4$ alkyl group and X is a halogen or mixture of halogens, preferably chlorine or bromine, most preferably chlorine and m is 1–3 inclusive. Preferably, the hydrocarbyl aluminum halide compound has $m=1$. Most preferably, the hydrocarbyl aluminum halide compound is an alkyl aluminum dichloride.

The quantity of halogen containing materials selected from the group consisting of halogen, halogen acid, or mixed halogen which must be reacted with the hydrocarbyl aluminum compound to obtain the desired catalyst is determined by the value of m in the hydrocarbyl aluminum compound. The molar ratio of the halogen containing material to $RAlX_2$ is about 0.014 to about 0.065, more preferably about 0.025 to about 0.055 and most preferably about 0.030 to about 0.050. The molar ratio of halogen containing material to $R_2AlX$ is about 0.030 to about 0.090, more preferably about 0.040 to about 0.080 and most preferably 0.050 to about 0.070. The molar ratio of halogen containing material to $R_3Al$ is about 0.040 to about 0.12, more preferably about 0.050 to about 0.11, and most preferably 0.06 to about 0.10.

It is a vital requirement of this invention that said aluminum compound be reacted with said halogen, halogen acid or mixed halogen compound sufficiently prior to introducing the resultant catalyst solution into a polymerization feed containing monomers and cosolvent so as to insure reaction between the catalyst component species to form the catalyst composition. The cosolvents of the instant invention are selected from the group consisting of cyclic, branched or normal paraffinic hydrocarbons, and mixtures thereof. A preferred cosolvent system is a blend of 75 wt. % of cyclohexane and 25% wt. % hexane. The weight ratio of isobutylene to cosolvent is critically selected at about 1 to about 10, more preferably at about 1.5 to about 6 and most preferably at about 2 to about 5. The critical selection of the ratio of isobutylene to cosolvent provides increased monomer % conversion at increased cement concentration thereby making the process more economical. The operating temperature of polymerization is about $-50°$ to about $-100°$ C., more preferably about $-60°$ to about $-95°$ and most preferably about $-70°$ to about $-90°$ C. The operating pressure is about 0 to about 1000 psig, more preferably about 5 to about 500, and most preferably about 15 to about 300 and the nominal residence time in a continuous process is about 1 to about 60 minutes, more preferably about 5 to about 30 and most preferably 10 to about 20.

The components used in forming the catalyst composition must be premixed, preferably at least 60 seconds, more preferably 20 seconds, most preferably 5 seconds before use. The halogen, halogen acid or mixed halogen compound may be admixed with a solution of hydrocarbylaluminum dihalide either as neat liquids, gases or preferably in solution in an inert solvent. Solvents such as paraffins are inert to halogens in the absence of free radical initiators and radiation, therefore, said solutions should be protected from light prior to the reaction with aluminum compound. It is absolutely essential that the components be premixed prior to use.

One embodiment of this invention is the utilization of said improved novel catalyst composition in a process for the preparation of isoolefin homopolymers and copolymers of an isoolefin with multiolefins or mixtures of multiolefins. These catalyst compositions have been found to be surprisingly useful for the production of valuable highly unsaturated high molecular weight copolymer of isobutylene with conjugated diolefin(s). Some of the characteristics of these processes are higher catalyst efficiencies and higher polymer molecular weights than are realized with ordinary hydrocarbylaluminum dihalides. Many of the novel catalyst compositions of this invention are soluble in hydrocarbons even paraffinic hydrocarbons. They are active in an all hydrocarbon system of monomers and solvents (cosolvents) and frequently give greater monomer conversions, more rapid polymerization, and higher molecular weights. Thus under a wide variety of conditions these catalysts achieve faster reactions and higher molecular weights at warmer tempertures than conventional hydrocarbyl aluminum dihalide catalysts. These catalyst compositions are particularly valuable for the production of extraordinarily high molecular weight, highly unsaturated copolymers of isobutylene and conjugated diolefins such as cyclopentadiene. As a consequence, highly unsaturated copolymers with number average molecular weights similar to those obtained with hydrocarbyl aluminum dihalide can be produced at substantially warmer polymerization temperatures.

The $M_n$ of the co- or terpolymers formed by the unique and novel process of the instant invention which employs the improved catalyst composition are about 30,000 to about 500,000, more preferably about 40,000 to about 400,000, and most preferably about 50,000 to about 300,000, wherein the mole % unsaturation is about 8 to about 45, more preferably about 10 to about 40, and most preferably about 12 to about 40.

A series of copolymers were prepared according to this invention by the following procedure using the unique and novel improved catalyst compositions of the instant invention.

EXAMPLE I

Two identical experiments were conducted in order to illustrate our invention. In the first experiment only methylaluminumdichloride (MADC) and no hydrogen halides were fed into the reaction zone, while in the second experiment anhydrous hydrogen chloride was mixed with the MADC prior to injection into the reaction zone. The contact time of the MADC and HCl was about 5 seconds.

All feed streams were dried before they were injected into a well-stirred stainless steel reactor (reaction zone). The first stream consisted of 78.4 wt. % isobutylene, 6.1 wt. % cyclopentadiene (CPD) and 15.5 wt. % cosolvent (75 wt. % cyclohexane and 25 wt. % hexane). The second feed stream consisted of methylaluminumdichloride dissolved in cosolvent (and anhydrous hydrogen chloride in experiment "B").

The first feed stream was chilled to a temperature of $-136°$ C. prior its continuous introduction into the reactor. The second (catalyst) stream entered the reactor through a separated feed nozzle at ambient temperature. The temperature of the reactor and its contents was maintained constant at $-104°$ C. by circulating refrigerant through the reactor jacket. The feed rates of the isobutylene, CPD and cosolvent were adjusted so that a 12-minute nominal residence time was provided in the reactor.

Polymerization occurred only in the reactor. The reactor effluent was contacted with an isopropyl alcohol-ammonia quench stream to deactivate the catalyst.

The process conditions were the following when the reactor achieved steady state:

TABLE 1

| Experiment | Reactor Temp. °C. | Nom. Res. Time Minutes | Feeds, grams/hr | | | | |
|---|---|---|---|---|---|---|---|
| | | | ISO-C$_4$= | CPD | Co-solv. | Catalyst MADC | HCl |
| A | −104 | 12 | 19,200 | 1,500 | 3,800 | 20.8 | 0.0 |
| B | −104 | 12 | 19,200 | 1,500 | 3,800 | 20.8 | 0.30 |

The reactor effluent was then stabilized with IRGANOX 1010. The stabilized polymer solution was then steam stripped, and the precipitated polymer crumb was dried on a hot mill.

The obtained process data and the copolymer properties are shown in Table 2 below.

TABLE 2

| Experiment | Cement Conc. Wt. % | Rate gr/hr | Catalyst Efficiency | Conversion, % | | Copolymer Properties | |
|---|---|---|---|---|---|---|---|
| | | | | ISO-C$_4$ | CPD | M % CPD by NMR | $\bar{M}n \times 10^{-3}$ |
| A | 4.4 | 1,085 | 52 | 4.1 | 19.4 | 21 | 119 |
| B | 8.7 | 2,130 | 102 | 8.6 | 32.4 | 24 | 154 |

Results in Table 2 indicate that the practice of this invention, surprisingly, results in a significant increase in both (isobutylene and CPD) conversions, catalyst efficiency and cement concentration. In addition to the process advantages, it also results in copolymers with much higher molecular weights ($\bar{M}n$ 154,000 versus 119,000).

EXAMPLE II

To demonstrate that methylaluminumdichloride (MADC) is preferred, another experiment was conducted following the procedure of Example I. The process conditions and the results of these tests are shown in Tables III and IV below.

TABLE 3

| Experiment | Catalyst | Reactor Temp. °C. | Nom. Res. Time Minutes | Feeds, grams/hr | | | | |
|---|---|---|---|---|---|---|---|---|
| | | | | ISO-C$_4$= | CPD | Cosolv. | Catalyst | Anh. HCl |
| A | EADC | −98 | 18 | 12,000 | 1,450 | 3,500 | 22.5 | .50 |
| B | MADS | −98 | 18 | 12,000 | 1,450 | 3,500 | 21.0 | .50 |

The obtained process data and the copolymer properties are shown in Table 4 below.

TABLE 4

| Exper. | Cement Conc. Wt. % | Cat. Eff. | Conv., % | | M % CPD | $M_L$ @ 127° C. | $\bar{M}n \times 10^{-3}$ |
|---|---|---|---|---|---|---|---|
| | | | ISO-C$_4$= | CPD | | | |
| A | 9.7 | 73 | 9 | 40 | 31 | 51 | 90 |
| B | 14.0 | 113 | 13 | 56 | 31 | 59 | 83 |

Results in Table 4 indicate that while both alkylaluminumdichlorides are excellent, methylaluminumdichloride is more active than ethylaluminumdichloride.

EXAMPLE III

To demonstrate that anhydrous hydrogen bromide also works in the instant invention, another experiment was conducted following the procedure of Example I. The process conditions and the results of this test are shown in Tables 5 and 6 below.

TABLE 5

| Contact Time of HBr and EADC | Reactor Temp. °C. | Nom. Res. Time, Min. | Feeds, grams/hr | | | | |
|---|---|---|---|---|---|---|---|
| | | | ISO-C$_4$= | CPD | Co-solv. | EADC | HBr |
| ~5 sec. | −107 | 18 | 12,800 | 1,330 | 2,560 | 11.34 | .63 |

The obtained process data and the copolymer properties are shown in Table 6 below.

TABLE 6

| Cement Conc. wt. % | Catalyst Efficiency | Conv. % | | Mole % CPD | $M_L$ @ 127° C. |
|---|---|---|---|---|---|
| | | ISO-C$_4$= | CPD | | |
| 7.7 | 113 | 6.5 | 34 | 32 | 53 |

EXAMPLE IV

In order to illustrate the scope of this invention, Table VII below shows a series of copolymers (made with the EADC HCl catalyst system according to our invention) with a wide range of unsaturation, molecular weight, and molecular weight distribution (expressed as Q; Q=$\overline{M}w/\overline{M}n$).

TABLE 7

| | Copolymer Properties | | GPC Data, MW × 10$^{-3}$ | | | |
|---|---|---|---|---|---|---|
| Example | CPD Cont. Mole % | $M_L$ @ 127° C. | $\overline{M}w$ | $\overline{M}v$ | $\overline{M}n$ | Q=$\overline{M}w/\overline{M}n$ |
| A | 11.5 | 52 | 1,100 | 819 | 147 | 7.5 |
| B | 36.5 | 112 | 1,286 | 884 | 140 | 9.2 |
| C | 24 | 55 | 677 | 518 | 135 | 5.0 |
| D | 31 | 78 | 1,108 | 723 | 105 | 10.5 |
| E | 35 | 40 | 450 | 312 | 72 | 6.2 |
| F | 36 | 52 | 410 | 315 | 77 | 5.3 |
| G | 37 | 75 | 948 | 650 | 80 | 11.9 |

The following terms are herein defined as used in the specification and claims and are as follows.

1. Rate-The rate of polymerization in grams per hour.
2. Efficiency-The catalyst efficiency was determined in terms of grams of polymer produced per grams of aluminum alkyl dihalide fed.
3. % Conversion-The percent of isobutylene and separately the percent of diene injected into the reaction vessel, which was converted into polymer product, was measured.
4. % Unsaturation-Diene Content-The mole % of diene in the polymer was measured by refractive index, or NMR.
5. Inherent Viscosity-The inherent viscosity of the polymer product was determined in decalin at 135° C. (AMI 148-023).
6. $\overline{M}_L$-The Mooney viscosity at 126.7° C. was determined using a large #1 rotor for 8 minutes.
7. $\overline{M}n$-The number average molecular weight was determined by membrane osmometry.
8. Gel Content-The percent of polymer insoluble in toluene at 100° C. One gram of polymer is dissolved in 100 ml of toluene at 100° C. and filtered through a 200 mesh screen. The amount of insoluble polymer retained on the screen is dried and weighed and converted into % insoluble polymer. By substantially gel free is meant less than about 2 wt. % of polymer insolubles.
9. Polydispersity, Q-Ratio of $\overline{M}w$ to $\overline{M}n$ measured by GPC.

What is claimed is:

1. A catalyst composition used for preparing polymers at polymerization conditions of about $-50°$ C. to about $-100°$ C. at a pressure of about 0 to about 1000 psig for about 1 to about 60 minutes from a mixture of monomers dissolved in a cosolvent, said cosolvent selected from the group consisting of cyclic, branched and normal paraffinic hydrocarbons, said mixture of monomers consisting essentially of an isoolefin and one or more multiolefins, said isoolefin being selected from the group consisting of isobutylene, 2-methyl-butene, 3-methyl-butene, 4-methyl-pentene-1 and β-pinene, said multiolefin being selected from the group consisting of isoprene, piperylene, cyclopentadiene, and methylcyclopentadiene and mixtures thereof, a weight ratio of said isoolefin to said cosolvent being about 1 to about 10, said catalyst composition comprising a soluble reaction product formed in a paraffinic hydrocarbon solvent from the reaction of a material of the formula RAlX$_2$ and a halogen containing material, wherein X is the same or different halogen selected from the group consisting of Cl and Br, wherein said halogen containing material is selected from the group consisting of Cl$_2$, Br$_2$, and BrCl, wherein R is an alkyl of straight or branched chain structure of from 1 to 7 carbon atoms, wherein the molar ratio of the halogen containing material to said RAlX$_2$ is about 0.014 to about 0.065, said catalyst composition being soluble in said mixture of monomers and said cosolvent, and a molar ratio of said catalyst composition to said mixture of said monomers being about 0.0002 to about 0.0008.

2. A catalyst composition of claim 14, wherein said catalyst composition is formed at least about 5 seconds prior to contacting with said monomers.

3. A catalyst composition of claim 14, wherein a concentration of said catalyst composition is said solvent is about 0.01 to about 50.0 wt. %.

* * * * *